United States Patent [19]

Caputo

[11] 4,030,570
[45] June 21, 1977

[54] ELEVATOR SYSTEM

[75] Inventor: William R. Caputo, Wyckoff, N.J.

[73] Assignee: Westinghouse Electric Corporation, Pittsburgh, Pa.

[22] Filed: Dec. 10, 1975

[21] Appl. No.: 639,336

[52] U.S. Cl. .......................................... 187/29 R
[51] Int. Cl.² ........................................ B66B 1/28
[58] Field of Search .................................... 187/29

[56] References Cited
UNITED STATES PATENTS

| 3,523,232 | 8/1970 | Hall et al. | 187/29 |
|---|---|---|---|
| 3,749,204 | 7/1973 | Caputo | 187/29 |
| 3,921,046 | 11/1975 | Anzai et al. | 187/29 X |

Primary Examiner—Robert K. Schaefer
Assistant Examiner—W. E. Duncanson, Jr.
Attorney, Agent, or Firm—D. R. Lackey

[57] ABSTRACT

An elevator system of the traction type having a direct current drive motor for moving the elevator car in a guided vertical path. An adjustable voltage source for the direct current motor is controlled by a control signal modified by a jitter suppression signal. The jitter suppression signal is proportional to vertical oscillation of the elevator car.

14 Claims, 3 Drawing Figures

ELEVATOR SYSTEM

BACKGROUND OF THE INVENTION

1. Field of the Invention

The invention relates in general to elevator systems, and more specifically to elevator systems of the traction type which are driven by a direct current motor.

2. Description of the Prior Art

Traction elevator systems suspend the elevator car on a plurality of wire ropes which pass over a traction sheave and are connected to a counterweight. The traction sheave is usually driven by an electrical drive motor, such as an A.C. induction motor via a reduction gear, or a D.C. motor, either directly or via a reduction gear, depending upon the contract speed of the elevator.

The mechanical system of the traction elevator, which consists of all rotational and translational inertia and cable spring compliance, behaves as a resonant system with very little damping. The oscillation frequency of the mechanical system ranges between about 3 and 15 hertz, and is a function of the aforesaid parameters, as well as the load in the elevator car, and the position and speed of the elevator car. Anything that perturbs the mechanical system at its resonant frequency can cause an annoying vertical oscillation of the elevator car, referred to as jitter.

The source of the perturbance which initiates the jitter may come from any one of a plurality of different sources. As discussed in my U.S. Pat. No. 3,749,204, jitter may be caused by electrical noise in the stabilizing signal applied to the velocity error signal in the control loop which determines the magnitude of the direct current voltage applied to the drive motor. U.S. Pat. No. 3,749,204 discloses an acceleration transducer for providing a stabilizing signal. A disadvantage of the acceleration transducer arrangement is that a variable amount of armature voltage feedback, (a parasitic signal in this case) is an integral part of the signal. The variability is due to the change in armature inductance with field strength and to armature resistance with temperature. The stabilizing signal provides some jitter suppression, but the required amount sometimes cannot be used because the system can become unstable at some higher frequency due to the parasitic signal. The present invention does not contain the parasitic signal and therefore allows a stronger signal to be applied to more effectively suppress the jitter with a smaller probability of causing instability at other frequencies. Also, the stabilizing function and the jitter suppression function are separated, which allows independent adustment to optimize stability and smoothness.

Unfortunately, the mechancal system may be shocked into resonance from other sources. For example, in those elevator systems in which the source of the adjustable direct current voltage is a static dual bridge converter, if the bridges are not switched precisely at zero current, a sudden torque change in the output shaft of the drive motor due to an abrupt armature current change may shock the mechanical system into resonance.

Another source of the perturbance, which may be produced with either a motor generator voltage source, or a static converter voltage source, is due to the relationship between the pole and other mechanical structure of the motor, the motor speed, and drive shear diameter. The output torque of the motor may be inherently perturbed due to its structure a predetermined number of times for each revolution of the motor, which for a predetermined motor speed and sheave diameter may translate to a perturbance frequency in the resonant frequency range of the mechanical system.

Thus, it would be desirable to be able to attenuate vertical oscillation of the elevator car, and prevent noticeable jitter, regardless of the perturbing source.

SUMMARY OF THE INVENTION

Briefly, the present invention is a new and improved elevator system of the traction type which includes an elevator car driven in a vertical path by a direct current motor. The direct current motor is connected to a source of adjustable direct current voltage, the polarity and magnitude of which is responsive to a control signal provided by a servo control loop which controls the speed and thus the position of the elevator car. The control signal is modified by a stabilizing signal proportional to vertical oscillation of the elevator car. In a preferred embodiment of the invention, a tachometer having a ripple less than 2%, peak-to-peak, of the output signal level, is driven by a selected portion of the rotating system, to eliminate electrical noise in the signal due to belts or gears. For relatively high speed machines, the tachometer may be co-axially mounted to the motor shaft, and for relatively low speed machines, the tachometer may be friction or rim-driven. "Rim-driven" will be used throughout the specification, but direct shaft driven should be inferred for higher speed motor applications. The tachometer signal is differentiated, and the differentiated signal is integrated, which peaks the resulting signal at the frequency of a disturbance in the rotating system which may cause vertical oscillation or jitter of the elevator car. This resulting signal is the stabilizing signal which is applied to a summing point in the servo control loop as negative feedback.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
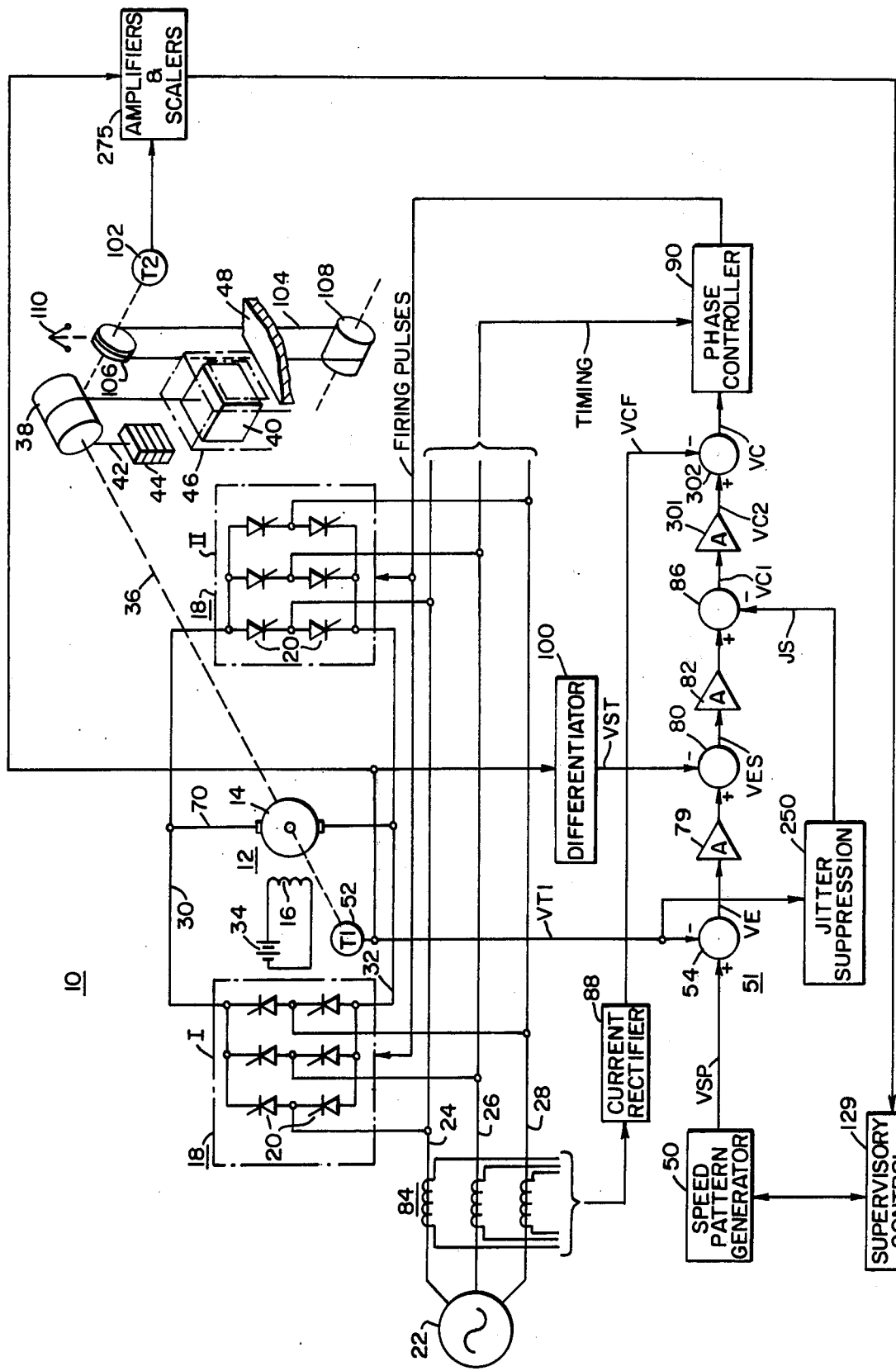
FIG. 1 is a partially schematic and partially diagrammatic view of an elevator system constructed according to the teachings of the invention.

Referring now to the drawings, and FIG. 1 in particular, there is shown a partially schematic and partially diagrammatic view of an elevator system 10 constructed according to the teachings of the invention. Elevator system 10 includes a direct current drive motor 12 having an armature 14 and a field winding 16. The armature 14 is electrically connected to an adjustable source of direct current potential. The source of potential may be a direct current generator of a motor generator set in which the field current of the generator is controlled to provide the desired magnitude of unidirectional potential; or, as shown in FIG. 1, the source of direct current potential may be a static source, such as a dual converter 18. The dual converter 18 is shown of purposes of example, and it is to be understood that the invention may equally apply to elevator systems in which a motor generator set is the source of the direct current potential.

The dual converter 18 includes first and second converter banks I and II, respectively, which may be three phase, full-wave bridge rectifiers connected in parallel opposition. Each converter includes a plurality of static controlled rectifier devices 20 connected to interchange electrical power between alternating and direct current circuits. The alternating current circuit includes a source 22 of alternating potential and busses 24, 26 and 28; and, the direct current circuit includes busses 30 and 32, to which the armature 14 of the direct current motor 12 is connected. The dual bridge converter 18 not only enables the magnitude of the direct current voltage applied to armature 14 to be adjusted, by controlling the conduction or firing angle of the controlled rectifier devices, but it allows the direction of the direct current flow through the armature to be reversed when desired, by selectively operating the converter banks. When converter bank I is operational, current flow in the armature 14 would be from bus 30 to bus 32, and when converter bank II is operational, the current flow would be from bus 32 to bus 30. Dual converter apparatus which may be used is shown in detail in U.S. Pat. Nos. 3,713,011 and 3,713,012, which are assigned to the same assignee as the present application.

The field winding 16 of drive motor 14 is connected to a source 34 of direct current voltage, represented by a battery in FIG. 1, but any suitable source, such as a single bridge converter, may be used.

The drive motor 12 includes a drive shaft indicated generally by broken line 36, to which a traction sheave 38 is secured. An elevator car 40 is supported by a rope 42 which is reeved over the traction sheave 38, with the other end of the rope being connected to a counterweight 44. The elevator car is disposed in a hoistway 46 of a structure having a plurality of floors or landings, such as floor 48, which are served by the elevator car.

The movement mode of the elevator car 40 and its position in the hoistway 46 are controlled by the voltage magnitude applied to the armature 14 of the drive motor 12. The magnitude of the direct current voltage applied to armature 14 is responsive to a velocity command signal VSP provided by a suitable speed pattern generator 50. A servo control loop 51 for controlling the speed, and thus the position of the elevator car 40 in response to the velocity command signal VSP is constructed according to the teachings of the invention, to attenuate vertical oscillation of the elevator car.

Figure 2:
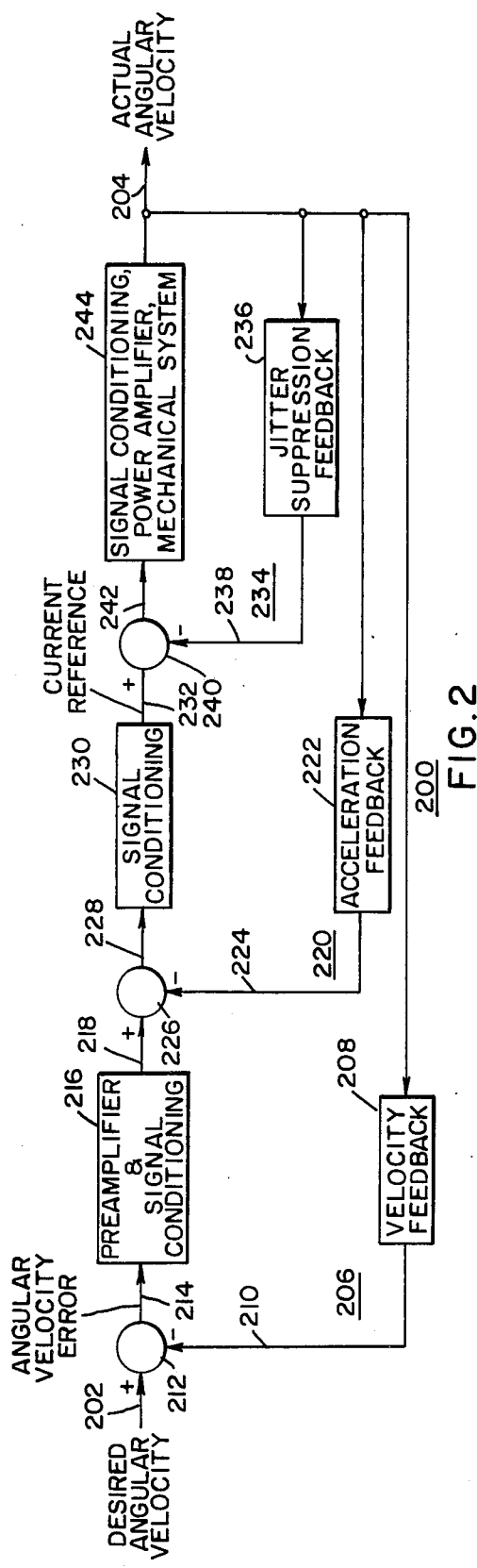
FIG. 2 is a block diagram of a velocity portion of the feedback control system shown in FIG. 1.

Before describing the specific embodiment of the invention shown in FIG. 1, it will be helpful at this point to describe the invention in its broadest aspect with the aid of the block diagram shown in FIG. 2.

More specifically, FIG. 2 is a block diagram of the velocity portion of a feedback control system 200 in which arrow 202 indicates the desired angular velocity of the elevator drive motor 12 shown in FIG. 1, and arrow 204 indicates the actual angular velocity of the motor.

A first negative feedback loop 206 includes a block 208 which provides a signal, indicated by arrow 210, responsive to the actual angular velocity of the motor. A summing point 212 compares the desired angular velocity and the actual angular velocity, and provides an error signal, indicated by arrow 214, responsive to any difference. The angular velocity error signal 214 is processed by block 216, which includes preamplifier and signal conditioning functions. The processed error signal, indicated by arrow 218, is the input signal to a second negative feedback loop 220 which includes a block 222 for providing an acceleration signal, indicated by arrow 224, responsive to the actual acceleration of the drive motor.

Arrows 218 and 224, representing the angular velocity error and acceleration signal, respectively, are applied to a summing point 226, which provides an acceleration error signal, indicated by arrow 228.

The stabilization provided by loop 220 is necessary in order to provide a smooth response to the command signal represented by arrow 202, but is not always sufficient in itself to dampen vertical oscillation of the elevator system at its resonant frequency.

The accleration error signal represented by arrow 228 is applied to block 230, which conditions the signal to be used as a current reference, which in turn will be used for comparison with the actual motor current. The current reference is illustrated in the hereinbefore mentioned U.S. Pat. Nos. 3,713,011 and 3,713,012 as block 32.

Proper conditioning of the stabilized error signal essentially involves integration of the error signal. The resulting current reference signal is indicated by arrow 232. It is at this point in the feedback control system that jitter suppression may best be applied, by a third negative feedback loop 234, which includes a block 236 for generating a jitter suppression signal, indicated by arrow 238. The jitter suppression signal 238 is proportional to vertical oscillation of the elevator car, and as illustrated in FIG. 2, it may be developed from the actual angular velocity of the drive motor.

The jitter suppression signal 238 modifies the current reference signal 232 at summing point 240, providing a modified current reference signal, indicated by arrow 242, which is applied to block 244. Block 244 includes the comparison circuits for comparing the modified current reference signal 242 with the actual motor current, as well as signal conditioning circuitry, the phase controller, the power amplifier, and the mechanical system, including the drive motor, from which the actual angular velocity 204 of the drive motor is derived.

The jitter suppression negative feedback loop is preferably applied in the current loop, i.e., at the summing point 240, because the current loop is a fast-acting loop which efficiently responds to the jitter suppression signal 238. It also enables stabilization and jitter suppression to be adjusted essentially independently. It is possible to apply the jitter suppression signal 238 in the servo loop at summing point 226, but a block having a transfer characteristic which is the reciprocal of the transfer characteristic of block 230 would have to be added in series with block 236. If the jitter suppression feedback and the acceleration feedback signals are integrally combined without separate adjustments and applied to summing point 226 one would be trying to achieve optimal stabilization and optimal jitter suppression with a single adjustment, which would result in a system which is more difficult to stabilize a system having less jitter suppression, and possibly a system which has a tendency toward high frequency oscillation, especially if a universal circuit were to be applied to different elevator systems. Thus, for these reasons, jitter suppression is best applied to the current loop, and the jitter suppression function should have an adjustment independent of the acceleration feedback adjustment.

The development of the jitter suppression function is preferably initiated from the actual angular velocity of the motor, the disturbance of which in the form of changes in the actual angular velocity of the drive motor, is a cause of jitter of the elevator car. A suitable jitter suppression signal cannot be developed by the usual tachometer arrangement for measuring angular velocity of the drive motor, due to the electrical noise created in the signal by the gearing or the belting of the conventional drive coupling.

Tachometers having sufficiently low ripple content in their output signals, such as less than 2% ripple, peak-to-peak, of the D.C. output level of the tachometer, are available, such as Magnedyne's 402–52, and if a low ripple tachometer is tightly coupled to the drive sheave motion by rim (friction) coupling, a suitable source signal for jitter suppression may be obtained. Such a drive arrangement is subject to slippage, but the slippage of the tachometer may be detected by using the new and improved double tachometer arrangement disclosed in copending application Ser. No. 638,448, filed Nov. 3, 1975, in the names of W. Caputo and J. DeLorenzi, which application is assigned to the same assignee as the present application. In this arrangement, slippage is detected by monitoring both motor rotation and car movement, and comparing signals response thereto in new and improved logic checking circuits.

Figure 3:
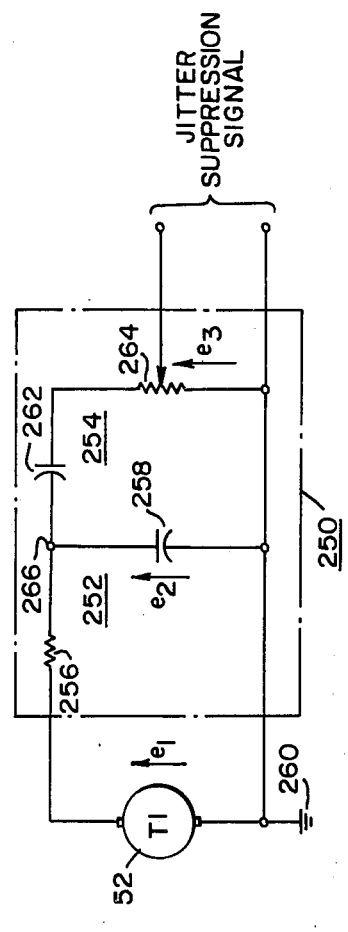
FIG. 3 is a schematic diagram of a jitter suppression circuit which may be used for the jitter suppression function shown in block form in FIGS. 1 and 2.

FIG. 3 is a schematic diagram of a jitter suppression circuit 250 which may be used for the function 236 shown in FIG. 2. Tachometer T1, also referenced 52, is the low ripple, friction coupled tachometer, and its direct current output voltage e1 is applied to jitter suppression circuit 250, which includes a differentiation stage 252 and an integration stage 254.

The differentiation stage 252 includes a resistor 256 and a capacitor 258 serially connected across the output terminals of the tachometer 52. One terminal of tachometer 52 and one end of capacitor 258 are connected to ground 260. The voltage e2 appearing across capacitor 258 is applied to the integration stage 254, which includes a capacitor 262 and a potentiometer 264, serially connected across capacitor 258. Capacitor 262 has one end connected to the junction 266 between resistor 256 and capacitor 258, and one end of potentiometer 264 is connected to ground 260. The voltage e3 appearing across the lower portion of potentiometer 264 is the jitter suppression signal 238 applied to summing point 240 in FIG. 2. The transfer function of circuit 250 is as follows:

$$\frac{e3}{e1} = \frac{As}{\left(\frac{s}{\omega 1} + 1\right)\left(\frac{s}{\omega 2} + 1\right)}$$

where $\omega 1$ and $\omega 2$ may be selected as follows: let $\omega 1 = \omega J / \sqrt{K}$ and $\omega 2 = K * \omega 1$ were $\omega J$ is equal to the dominant jitter frequency in radians per second, and K is equal to ratio of $\omega 2$ to $\omega 1$ (arbitrarily, let K be in the range of 5 to 10). $\omega J$ is therefore at the geometrical mean of $\omega 1$ and $\omega 2$. The actual values of $\omega 1$ and $\omega 2$ may be changed to suit the application in order to achieve optimum jitter suppression and stability.

The differentiation of the velocity signal makes the jitter suppression signal acceleration related. Since the output of a differentiated signal increases with increasing frequency, and the output of an integrator decreases with increasing frequency, the effect of the jitter suppression circuit shown in FIG. 3 is to intentionally peak the signal at the natural frequency of the mechanical system.

The acceleration feedback function 222 may use the acceleration transducer disclosed in my U.S. Pat. No. 3,749,204. However, since the hereinbefore mentioned copening application makes a rim-driven, low ripple tachometer practical, the acceleration feedback signal is preferably provided by differentiating the output of the low ripple tachometer 52.

The velocity feedback function 208 may be provided by the output of the low ripple tachometer 52.

Referring now to FIG. 1, an implementation of the invention shown functionally in FIG. 2 will now be described. Tachometer 52 is the low ripple, rim-driven tachometer hereinbefore referred to, which tachometer is friction-driven by the motor shaft, by the drive sheave, or by any other suitable rotating surface. In a preferred embodiment, a resilient roller, such as a polyurethane roller, is mounted on the drive shaft of the tachometer 52, and it may be friction-driven by a suitably machined surface on the inside of the drive sheave.

According to the teachings of the hereinbefore mentioned copending application, a second tachometer T2, also referenced 102, is provided which is responsive to the speed of the elevator car 40. The second tachometer 102 provides a check on the rim-driven tachometer 52, and it may be a less costly tachometer than tachometer 52, i.e., it may have a higher ripple component compared with that of tachometer 52, since its output will not be differentiated to provide stabilizing and jitter suppression signals. The second tachometer 102 may be driven from the governor assembly which includes a governor rope 104 connected to the elevator car 40, reeved over a governor sheave 106 at the top of the hoistway 46, nd reeved over a pulley 108 connected at the bottom of the hoistway. A governor 110 is driven by the shaft of the governor sheave, and the tachometer 102 may also be driven by the shaft of the governor sheave 106, such as via a belt drive arrangement. The belt drive is fail-safe with broken belt switches, and since the signal from tachometer 102 will not be differentiated, the electrical noise added to the signal by the belt drive is not of critical importance.

The outputs of the tachometers 52 and 102 are applied to amplifiers and scalers, shown generally at 275, and signals from the amplifiers and scalers 275 are applied to the supervisory control 129, which processes the signals as disclosed in the copending application. The supervisory control 129, which also receives the calls for elevator service and signals responsive to car location and travel direction, controls the speed pattern generator 50 to initiate the acceleration and deceleration portions of the speed pattern signal VSP as required to serve calls for elevator service.

A signal VT1 responsive to the actual speed of the elevator drive motor 12 is provided by the first tachometer 52. A summing point 54 provides an error signal VE responsive to any difference between the velocity command signal VSP and the actual speed of the motor 12, represented by signal VT1.

Since the tachometer 52 has a low ripple component in its output signal, and since the rim drive introduces a minimum of electrical noise into the output signal, a superior stabilizing signal for achieving smooth system response is obtained by taking the derivative of a tachometer output signal VT1. Accordingly, a differentiation circuit 100 is provided for differentiating signal VT1 and providing a stabilizing signal VST. The stabilizing signal VST is applied as a negative feedback signal to the closed control loop, which produces the signal VE. Signal VE, which is amplified and conditioned in amplifier 79, as described relative to function 216 in FIG. 2, and signal VST, are applied to a summing point 80 with the algebraic signs illustrated in FIG. 1, in order to provide an acceleration error signal VES. The error signal VES is amplified in an amplifier 82, which, as described relative to block 230 in FIG. 2, includes an integrating function, and the amplified and conditioned signal VES is compared with a signal JS in a comparator 86, with a signal JS being the jitter suppression signal, which may be the output $e3$ of jitter suppression circuit 250 shown in FIG. 3. The output of the summing point 86 is a bidirectional current reference signal VC1.

Signal VCF is responsive to the current supplied to the dual converter 18, and thus to the armature current of the motor 12. Signal VCF may be provided by any suitable feedback means, such as by a current transformer arrangement 84 disposed to provide a signal responsive to the magnitude of the alternating current supplied by the source 22 to the converter 18 via busses 24, 26 and 28, and a current rectifier 88 which converts the output of the current transformer arrangement 84 to a direct current signal VCF. The bidirectional current reference signal VC1 is applied to a summing point 302 via an amplifier 301, for comparison with the unidirectional signal VCF. As disclosed in U.S. Pat. No. 3,713,012, amplifier 301 includes a switching amplifier which is responsive to the polarity of the armature current to enable the unidirectional signal VCF to be used. The current reference command signal VC2 output by amplifier 301 will always be switched to the correct polarity to work with signal VCF.

Signals VCF and VC2 are compared in a summing point 302, to provide a signal VC responsive to the algebraic differences, with signal VC being applied to the power amplifier or phase controller 90. Phase controller 90, in response to timing signals from busses 24, 26 and 28 and the signal VC, provides phase controlled firing pulses for the controlled rectifier devices of the operational converter bank. The hereinbefore mentioned U.S. Pat. No. 3,713,012 discloses a phase controller which may be used for the phase controller 90 shown in FIG. 1.

An elevator system having objectionable jitter was modified according to the teachings of the invention, and several full speed runs wee made in both the up and down directions using different combinations of velocity feedback, acceleration feedback, and jitter suppression signals. An accelerometer in the elevator car measured maximum peakto-peak acceleration or jitter. The results of these tests are shown in Table I.

TABLE I

| Run | Velocity Feedback | Acceleration Feedback | Jitter Suppression | Maximum Peak-to-Peak Acceleration (ft./sec.$^2$) |
|---|---|---|---|---|
| 1-U | B | S | N | 2.75 |
| 2-U | B | S | R | .5 |
| 3-U | R | S | N | 2.5 |
| 4-U | R | S | R | .4 |
| 5-U | R | R | R | .15 |
| 1-D | B | S | N | 2.75 |
| 2-D | B | S | R | .5 |
| 3-D | R | S | N | 2.5 |
| 4-D | R | S | R | .4 |
| 5-D | R | R | R | .15 |

Where:
B = Belt-driven tachometer
S = Stabilizing transformer
R = Rim-driven low ripple tachometer
N = None Runs 1-U and 1-D illustrate the unmodified elevator system, which used a belt-driven tachometer for providing the velocity feedback signal (arrow 210 in FIG. 2), the stabilizing transformer or acceleration transducer described in U.S. Pat. No. 3,749,204 for the acceleration feedback signal (arrow 224 in FIG. 2), and no jitter suppression. A maximum peak-to-peak acceleration of 2.75 ft./sec.$^2$ was measured, and the jitter which this represents was objectionable.

Runs 2-U and 2-D were made using a rim-driven, low ripple tachometer (Magnedyne 402-52), and the jitter suppression circuit 250 shown in FIG. 3 was used to provide a jitter suppression signal. The maximum peak-to-peak acceleration was 0.5 ft./sec.$^2$, which is an acceptable amount of jitter, and the ride was significantly improved.

Runs 3-U and 3-D were made without jitter suppression, using the rim-driven, low ripple tachometer for the velocity feedback, and the acceleration transformer for the acceleration feedback. This resulted in no significant improvement over the original runs 1-U and 1-D, illustrating that the improvement achieved in runs 2-U and 2-D were not due solely to the use of a low ripple, rim-driven tachometer.

Runs 4-U and 4-D were made using the low ripple, rim-driven tachometer for velocity feedback and for jitter suppression, while retaining the acceleration transformer for acceleration feedback, and the improvement over the original system was signficant, as it was for runs for 2-U and 2-D, but the improvement over runs 2-U and 2-D was slight.

Runs 5-U and 5-D were made as illustrated in FIG. 1 and hereinbefore described, using the low ripple, rim-driven tachometer as the source for the velocity and acceleration feedback loops, as well as the source for the jitter suppression loop, and the jitter dropped to 0.15 ft./sec.$^2$, which was a significant improvement over even the acceptable runs 2-U, 2-D, 4-U, and 4-D, and the ride was very smooth.

In summary, there has been disclosed a new and improved elevator system which includes effective jitter suppression without attempting to directly dampen vertical oscillation of the car, which would be difficult to achieve by any known method. The jitter suppression is applied to a main source of the jitter producing oscillations, i.e., to the drive motor itself, and the signal proportional to vertical oscillation of the car is derived from the drive motor. Further, the jitter suppression signal, in the preferred embodiment of the invention, is applied in the current loop of the servo control system, making jitter suppression independent of the stabilization function, and thus both jitter suppression and stabilization are independently and optimally adjustable.

I claim as my invention:

1. An elevator system comprising:
   an elevator car mounted for vertical movement in a guided path,
   drive means including a direct current motor for driving said elevator car in its guided path,
   power means providing a direct current voltage for said direct current motor,
   jitter suppression means providing a jitter suppression signal proportional to a selected system parameter which may cause vertical oscillation of said elevator car,
   and control means providing a control signal modified by said jitter suppresson signal, said modified control signal being applied to said power means to control the magnitude of the direct current voltage applied to said direct current motor while attenuating vertical oscillation of said elevator car.

2. The elevator system of claim 1 wherein the jitter suppression means includes a tachometer which provides a direct current output voltage proportional to the speed of the direct current motor, and wherein the means which provides the jitter suppresson signal is responsive to changes in the output voltage of the tachometer produced by motor speed changes which are related to vertical oscillation of the elevator car.

3. The elevator system of claim 2 wherein the tachometer is a low ripple tachometer, having a ripple content in its output voltage which is less than about 2%, peak-to-peak, of the output voltage level.

4. The elevator system of claim 1 wherein the jitter suppression means includes a tachometer which provides a low ripple direct current output voltage provides a low ripple direct current output voltage proportional to the speed of the direct current motor, and circuit means for providing the jitter suppression signal in response to the output voltage of said tachometer, said circuit means including means differentiating the output voltage of the tachometer, and means integrating the differentiated signal, to peak the signal in the range of the frequency which may cause vertical oscillation.

5. An elevator system, comprising:
   an elevator car mounted for vertical movement in a guided path,
   an adjustable voltage source,
   drive means including a direct current drive motor having an armature connected to said adjustable voltage source, said drive motor driving said elevator car in its guided path,
   means providing a current reference signal indicative of the desired armature current,
   means providing a current signal response to the actual armature current,
   means providing a jitter suppression signal proportional to a selected system parameter which may cause vertical oscillation of said elevator car,
   and means providing a current error signal responsive to said current reference signal, said current signal, and said jitter suppression signal,
   said adjustable voltage source providing a voltage for said direct current drive motor responsive to said current error signal.

6. The elevator system of claim 5 wherein the means which provides the jitter suppression signal is responsive to changes in the angular velocity of the drive motor which may cause vertical oscillation of the elevator car.

7. The elevator system of claim 5 wherein the means which provides the jitter suppression signal includes means providing a velocity signal responsive to the angular velocity of the drive motor, means differentiating said velocity signal, and means integrating said differentiated velocity signal.

8. The elevator system of claim 7 wherein the means which provides the velocity signal includes a low ripple, rim-driven tachometer.

9. The elevator system of claim 5 wherein the adjustable voltage source is a converter having static switching devices.

10. The elevator system of claim 5 wherein the means which provides the current reference signal includes first means providing a speed pattern reference signal, second means providing a velocity signal proportional to the velocity of the elevator car, third means providing a velocity error signal responsive to any difference between said speed pattern reference signal and said velocity signal, fourth means providing a velocity stabilizing signal proportional to the rate of change of the velocity of the elevator car, fifth means providing a stabilized velocity error signal responsive to the difference between said velocity error signal and said velocity stabilizing signal, and sixth means providing the current reference signal in response to said stabilized velocity error signal.

11. The elevator system of claim 10 wherein the second means includes a tachometer which provides the velocity signal in response to the angular velocity of the drive motor, the fourth means provides the velocity stabilizing signal in response to the rate of change of the velocity signal, and the means which provides the jitter suppression signal is responsive to the velocity signal.

12. The elevator sytem of claim 11 wherein the means which provides the jitter suppression signal includes means differentiating the velocity signal, and means intergrating the differentiated velocity signal.

13. An elevator system, comprising:
   an elevator car mounted for vertical movement in a guided path,
   drive means including a direct current motor having an armature, said direct current motor driving said elevator car in its guided path,
   means providing a speed pattern reference signal,
   means providing a velocity signal proportional to the speed of the elevator car,
   means providing a velocity error signal responsive to any difference between said speed pattern reference signal and said velocity signal,
   means responsive to said velocity error signal for providing a current reference signal,
   means providing a current signal responsive to the armature current of said direct current motor,
   means providing a jitter suppression signal proportional to a selected system parameter which may cause vertical oscillation of said elevator car,
   means providing a current error signal responsive to said current reference signal, said current signal, and said jitter suppression signal,
   and means providing an adjustable voltage source responsive to said current error signal,
   said motor being connected to said adjustable voltage source.

14. An elevator system, comprising:
an elevator car mounted for vertical movement in a guided path,
drive means including a direct current motor having an armature, said direct current motor driving said elevator car in its guided path,
means providing a speed pattern reference signal,
first feedback means providing a first feedback signal, said first feedback signal being proportional to the angular velocity of said motor,
means comparing the speed pattern reference signal with the firt feedback signal to provide a velocity error signal responsive to any difference,
means stabilizing said velocity error signal, including second feedback means, said second feedback means providing a negative feedback signal proportional to the rate of change of the angular velocity of said motor,
means providing a current reference signal responsive to said stabilized velocity error signal,
third feedback means providing a third feedback signal proportional to the motorarmature current,
means comprising the current reference signal with the third feedback signal to provide a current error signal responsive to any difference,
fourth feedback means providing a fourth feedback signal proportional to a system parameter which may cause vertical oscillation of said elevator car,
said fourth feedback signal modifying said current error signal,
and means providing an adjustable voltage source responsive to said modified current error signal,
said motor being connected to said adjustable voltage source.

* * * * *